United States Patent [19]

Tanioka et al.

[11] Patent Number: 4,674,719
[45] Date of Patent: Jun. 23, 1987

[54] DEVICE FOR SECURING A BRAKE HOSE AT AN INTERMEDIATE PORTION THEREOF TO AN APPROPRIATE POINT IN A VEHICLE BODY

[75] Inventors: Norio Tanioka, Ibaraki; Hisayoshi Kimura, Matsudo; Isamu Suzuki, Hitachi, all of Japan

[73] Assignee: Hitachi Cable, Ltd., Tokyo, Japan

[21] Appl. No.: 787,624

[22] Filed: Oct. 15, 1985

[51] Int. Cl.⁴ .................................. F16L 5/00
[52] U.S. Cl. ........................ 248/56; 285/62; 285/256
[58] Field of Search .......... 285/62, 256, 259; 248/75, 56

[56] References Cited

U.S. PATENT DOCUMENTS

| | | | |
|---|---|---|---|
| 1,825,005 | 9/1931 | Loughead | 285/256 |
| 2,562,116 | 7/1951 | Nelson | 285/259 X |
| 3,345,091 | 10/1967 | Nicol | 285/256 |
| 4,346,863 | 8/1982 | Zeitrager et al. | 248/75 |
| 4,601,448 | 7/1986 | Miyozaki et al. | 248/56 |

FOREIGN PATENT DOCUMENTS 1273931 7/1968 Fed. Rep. of Germany ...... 285/256

Primary Examiner—Dave W. Arola
Attorney, Agent, or Firm—Helfgott & Karas

[57] ABSTRACT

A device for securing a brake hose at an intermediate portion thereof to an appropriate point in a vehicle body comprises an outer body provided on the circumference of the brake hose, and a nipple positioned beneath the inner surface of the brake hose. The outer body is provided with a collar, a groove and a sleeve portion on which compressing force is applied while the nipple is provided with a main groove at a point corresponding to the compressing force applying point and auxiliary grooves adjacent to the main groove.

2 Claims, 5 Drawing Figures

DEVICE FOR SECURING A BRAKE HOSE AT AN INTERMEDIATE PORTION THEREOF TO AN APPROPRIATE POINT IN A VEHICLE BODY

BACKGROUND OF THE INVENTION

The present invention relates to a device for securing a brake hose, and more particularly to a device for securing a brake hose at an intermediate portion thereof wherein the displacement between an outer body provided over the hose and a nipple inserted into the hose is prevented from occuring, thereby resulting in higher reliability.

In FIGS. 1A and 1B, there are shown conventional devices for securing a brake hose for a vehicle at an intermediate portion thereof which are disclosed in Japanese Utility Model Publication No. 59-22382 (22382/1984). The device for securing a brake hose comprises an outer body 100 provided over the circumference of the brake hose 200 and a nipple 300 positioned beneath the inner surface of the brake hose 200. The outer body 100 comprises a collar 110 and a groove 120 (FIG. 1A) or grooves 120 and 130 (FIG. 1B) respectively which engages members (not shown) for securing the brake hose 200 at an intermediate portion thereof to an attaching point in a vehicle. The nipple 300 is shaped to be concaved at two points 310 and 320 (FIG. 1A) or to be convexed at two points 330 and 340 (FIG. 1B).

In a practical use, the outer body 100 is subject to compressing force at the grooves 120 and 130 against the nipple 300 which is prevented from moving by the concave portions 310 and 320 or the convex portions 330 and 340 whereby the brake hose 200 is compressed between the outer body 100 and the nipple 300 to be fixed to each other so that the brake hose 200 is secured at an intermediate portion thereof to an attaching point in a vehicle. On the other hand, the brake hose 200 is connected at one end to the vehicle body and at another end to the wheel brake assembly.

In the device for securing a brake hose as illustrated in FIGS. 1A and 1B, however, there is the disadvantage that the displacement between the outer body 100 and the nipple 300 can not be prevented completely under a vibrating condition for a long time. This is due to the reason that the compressing force must be less than a predetermined value to prevent the outer body 100 from being deformed thereby to enhance the reliability on the securing of the brake hose 200 through the outer body 100.

SUMMARY OF THE INVENTION

Accordingly, it is an object of the present invention to provide a device for securing a brake hose at an intermediate portion thereof wherein the displacement between the outer body and the nipple is decreased to the minimum rate.

It is a further object of the present invention to provide a device for securing a brake hose at an intermediate portion thereof wherein the device is very easy to be assembled and to be secured to an attaching point in a vehicle.

It is still a further object of the present invention to provide a device for securing a brake hose at an intermediate portion thereof which gives higher reliability resulting from higher durability.

According to the present invention, a device for securing a brake hose at an intermediate portion thereof comprises an outer body provided over the circumference of the brake hose and a nipple positioned beneath the inner surface of the brake hose, said outer body being provided with a collar and groove respectively engaging members for securing a brake hose and sleeve portion on which compressing force is applied while said nipple is provided with a main groove at a point corresponding to said compressing force applying point and auxiliary grooves adjacent to said main groove.

In a preferred embodiment, the depth of the main groove may be 3 to 12% of the inner diameter of the brake hose.

BRIEF DESCRIPTION OF THE DRAWINGS

The invention will be explained in detail with reference to the accompanying drawings in which.

DESCRIPTIONS OF THE PREFERRED EMBODIMENTS

Figure 1A:
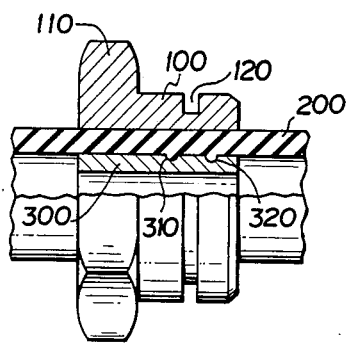
FIG. 1A and FIG. 1B are partial cross-sectional view illustrating devices for securing a brake hose at an intermediate portion thereof as in the prior art.
Figure 1B:
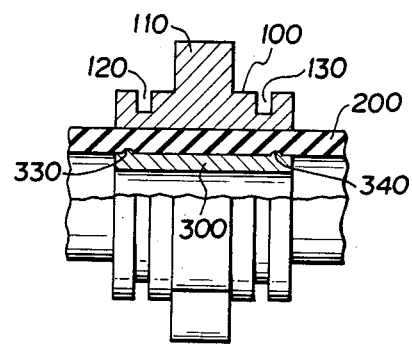
Figure 2:
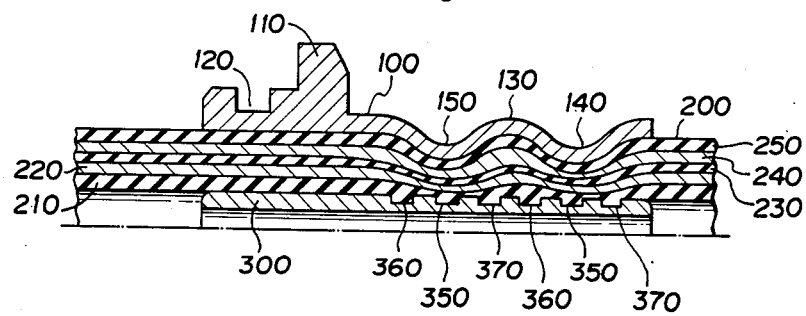
FIG. 2 shows an upper half cross-sectional view illustrating an embodiment of the present invention.
Figure 3:
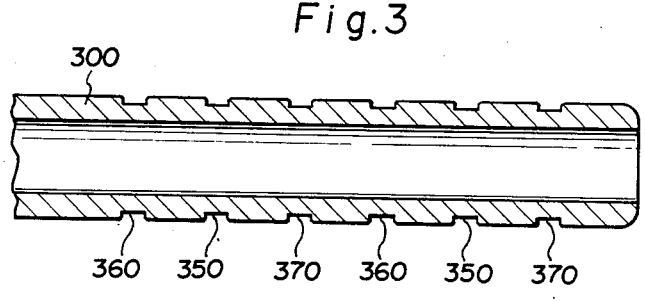
FIG. 3 shows an upper half cross-sectional view illustrating a nipple in the present invention.
Figure 4:
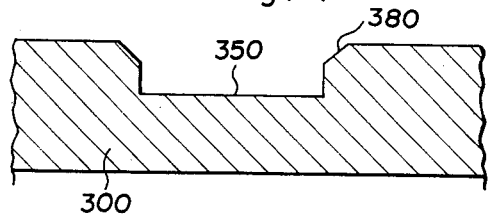
FIG. 4 shows a partial cross-sectional view illustrating the main groove of the nipple of the present invention.

In FIGS. 2 to 4, reference numeral 100 indicates an outer body which comprises a collar 110 being larger in outer diameter than the remaining portion thereof, a groove 120 into which an engaging member (not shown) is inserted and a sleeve portion 130 on which compressing force is applied at points 140 and 150 thereof, reference numeral 200 indicates a brake hose which comprises an inner rubber layer 210, a first brading layer 220, an intermediate rubber layer 230, a second brading layer 240 and an outer rubber layer 250, and reference numeral 300 indicates a nipple 300 which is formed to have main grooves 350 at points corresponding to compressing force applying points 140 and 150 and auxiliary grooves 360 and 370 adjacent to each of the respective main grooves 350. As shown in FIG. 4, the main groove 350 is shaped to have chamferred corners 380 at both sides thereof. The auxiliary grooves 360 and 370 may be provided with such chamferred corner as well. In FIG. 2, it is understood that the outer body 100 and the nipple 300 are the same in length and aligned to each other. The main grooves 350 are positioned at the points corresponding to the compressing force applying points 140 and 150 so that the inner rubber layer 210 of the brake hose 200 is forced effectively into the main grooves 350 and the auxiliary grooves 360 and 370. Further, the sleeve 130 is also forced to compress the brake hose 200 at the compressing force applying points. For this reason, any longitudinal displacement between the outer body 100 and the nipple 300 is prevented from occuring under the vibrating condition for a long time. In other words, such displacement can be avoided effectively in accordance with the elasticity of the rubber hose 200 and the compressing force applied thereon.

In FIG. 3, the main grooves 350 and the auxiliary grooves 360 and 370 are of the same shape, size and pitch while they may be different in shape, size and pitch from each other in the spirit of the invention defined in the attached claims.

The nipple 300 is easily to be inserted into the brake hose 200 in that the main grooves 350 and the auxiliary grooves 360 and 370 have the chamferred corners 380. The brake hose 200 is prevented from being damaged by the existence of the chamferred corners 380.

As described above, the reason why a main groove is provided at a point on the outer surface of a nipple corresponding to compressing force applying point is that an inner rubber layer of a brake hose is forced into the main groove when a sleeve portion of a main body is compressed. Next, the reason why auxiliary grooves are provided at both sides of the main grooves is that the inner rubber layer is forced into the main or auxiliary grooves even if the compressing force is applied at a wrong point to a sleeve portion of the main body and that the nipple is prevented from moving along the axial direction when the compressing force is applied to the sleeve portion of the main body. Further, the reason why the depth of the main groove is set as 3 to 12% of an inner diameter of the brake hose is that the inner rubber layer is not sufficient to be forced into the main groove of the nipple if such depth is less than 3% while the compressing force can not be applied to the sleeve portion of the main body because the bending strength of the nipple is lowered if such depth is more than 12%. Although the width of the groove is not limited, the groove is appropriate in width in the range of 1.5 to 5 times the depth thereof in view that the inner rubber layer is adequately forced thereinto. The groove may be chamferred at the corner thereof in the range of 0.05 to 0.30. Although the outer diameter of the nipple is decided depending upon the inner diameter of the brake hose, it is appropriate to be in the range of 1.001 to 1.005 times the inner diameter of the brake hose. That is to say, the displacement of the nipple tends to occur if the outer diameter thereof is less than 1.001 times the inner diameter of the brake hose while the nipple is very difficult to be inserted into the brake hose if the outer diameter thereof is more than 1.005 times the inner diameter of the brake hose.

Although the invention was described with reference to preferred embodiments, it is understood that the invention may be changed, altered or modified within the spirit of the scope of claims.

What we claim is:

1. A device for securing a brake hose at an intermediate portion thereof to an appropriate point in a vehicle body which comprises an outer body provided on the circumference of the brake hose and a nipple having a diameter of about 1.001 to 1.005 times the inner diameter of the brake hose positioned beneath the inner surface of the brake hose at such intermediate portion to be aligned in an axial direction with said outer body, said outer body being provided with a collar having a larger diameter than the remaining portion thereof, at least one groove formed on the outer surface thereof and a sleeve portion having an outer diameter less than that of said outer surface and on which a compressing force is applied, said nipple being provided with at least one main groove formed at a point corresponding to the compressing force applying point on said sleeve portion, said main groove having a depth in the range of 3 to 12% of the inner diameter of said brake hose and a width of about 1.5 to 5 times the depth of said groove and auxiliary grooves formed on said nipple at two opposite points from said main groove.

2. A device for securing a brake hose at an intermediate portion thereof to an appropriate point in a vehicle body of claim 1 in which said main groove and said auxiliary grooves of said nipple is shaped to have chamferred corners respectively.

* * * * *

UNITED STATES PATENT AND TRADEMARK OFFICE
CERTIFICATE OF CORRECTION

PATENT NO. : 4,674,719

DATED : June 23, 1987

INVENTOR(S) : Norio Tanioka, Hisayoshi Kimura and Isamu Suzuki

It is certified that error appears in the above-identified patent and that said Letters Patent are hereby corrected as shown below:

> On the title page, item [30]
> Foreign Application Priority Data
> insert -- December 12, 1984 Japan    59-262300--

Signed and Sealed this

Eighth Day of March, 1988

*Attest:*

DONALD J. QUIGG

*Attesting Officer*    *Commissioner of Patents and Trademarks*